Oct. 5, 1926.
N. M. ROSENDAHL
1,601,742
HOISTING MECHANISM
Filed Sept. 8, 1925
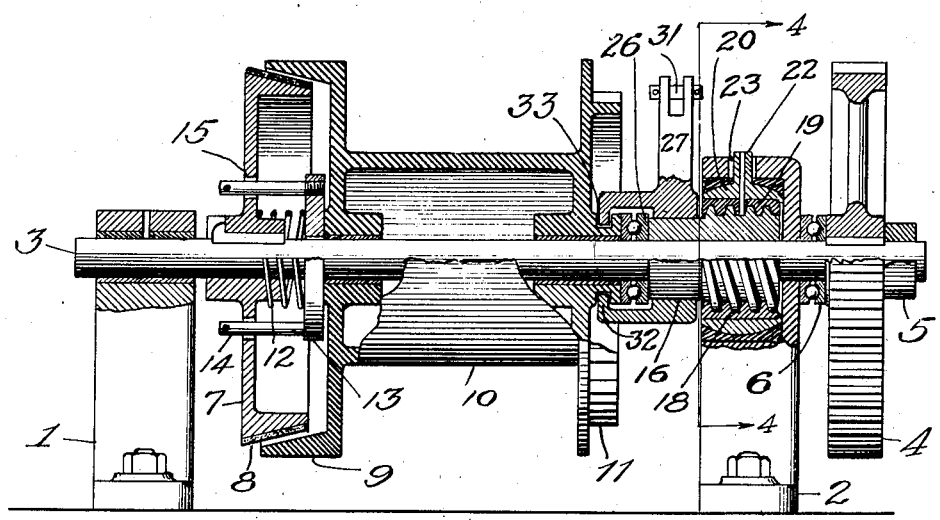
Fig. 1
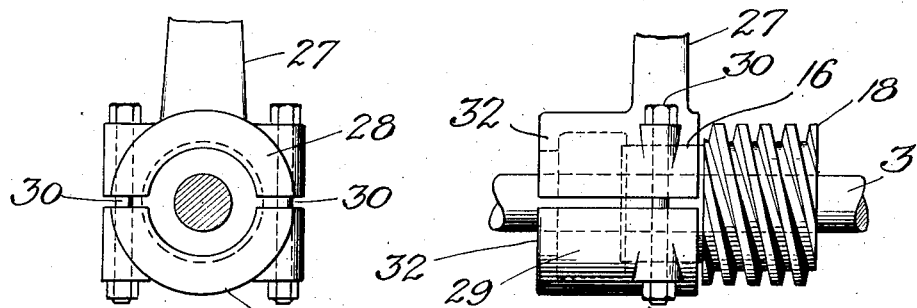
Fig. 2
Fig. 3
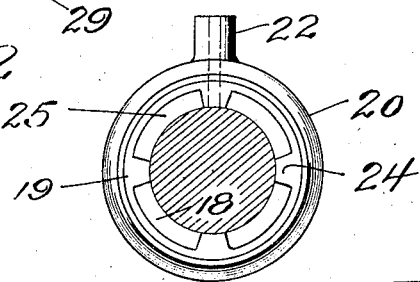
Fig. 4
Witnesses:
H. R. McDermott
M. R. Rosendahl
Inventor:
Nils Mathias Rosendahl
by B. Singer
Atty.

Patented Oct. 5, 1926.

1,601,742

UNITED STATES PATENT OFFICE.

NILS MATHIAS ROSENDAHL, OF WATERLOO, IOWA.

HOISTING MECHANISM.

Application filed September 8, 1925. Serial No. 55,145.

The invention relates to improvements in hoisting mechanism.

It is an object of the invention to provide a safety hoist by means of which the operation of lowering or hoisting the load can be suitably retarded without altering the speed of the drive for the mechanism.

It is also an object of the invention to provide in a safety hoist a mechanism for increasing or decreasing longitudinal thrust of two clutch members relatively to each other, whereby upon the adjustment of the thrust, the driven part is moved either together with or relatively to the driving part.

Another object of the invention is to provide a mechanism of this character in which variation of the force of thrust is effected by axial displacement of one of the members induced through a rotary displacement of a third element.

It is, furthermore, an object of the invention to facilitate release of two clutch members from each other by yieldingly forcing one clutch element permanently in direction away from the other.

With these and numerous other objects in view, an embodiment of the invention is illustrated in the accompanying drawings, wherein:—

Fig. 1 is part elevation and partly a sectional view of the principal parts of the hoisting mechanism;

Fig. 2 is an end elevation of a detail effective for varying the longitudinal thrust;

Fig. 3 is a side elevation of the parts illustrated in Fig. 2, and

Fig. 4 is a section on line 4—4 of Fig. 1.

The hoisting mechanism comprises the bearing brackets 1 and 2 in which the drive shaft 3 is rotatably supported. Rotation may be imparted to the drive shaft 3 by means of a gear 4 mounted on the projecting end of the shaft and driven from any suitable source (not shown). The gear 4 is held against axial displacement on the shaft 3 by means of a collar 5 secured to said shaft, and by means of a ball bearing 6 adapted to receive axial thrust, and interposed between the gear and the adjacent bearing bracket 2.

The shaft 3, furthermore, supports rigidly secured thereto, as by means of the key, a clutch cone 7 which may be provided on its circumferential surface with a suitable friction lining 8. The companion clutch member 9 is formed as a flange having a corresponding internal conical surface, and is rigidly secured or integral with the hoist drum 10 which is loosely mounted on the shaft 3 and which may be provided at one of its ends with a ratchet 11 whereby a load may be held by means of a pawl supported on some portion of the mechanism, the pawl and its support not being shown.

Normally the companion clutch elements 7 and 9 are spaced from each other, for which purpose a spring 12 surrounds the hub of the clutch member 7 and rests at one end against the hub of the clutch member, while the other end forces a follower plate 13 loosely surrounding the shaft 3 into engagement with the hoisting drum 10. Concurrent rotation of the clutch member 7 and the follower plate 13 is effected by means of bolts or pins 14 fixedly inserted into the follower 13 and projecting through suitable openings 15 in the web of the clutch member 7.

While the end of the driving shaft 3 adjacent the clutch member 7 may be rotatably supported in an ordinary journal bearing in the bracket 1, an intermediate portion of the shaft is supported in a bearing of peculiar construction. A sleeve 16 is provided on a portion of its outer circumference with a screw thread 18, and the shaft 3 extends loosely thru the threaded sleeve 16, so that even upon rotation of the shaft 3 in either direction no rotary movement is imparted to the threaded sleeve. The latter is supported within the bearing bracket 2 by means of a suitable nut 19 in which the screw threads 18 are properly guided. This nut 19 again, having a cylindrical outer circumference rests within a bearing member 20 of partly spherical shape, the space between the bearing member 20 and the bracket 2 being advisably filled with some anti-friction metal, poured after the parts have been properly assembled. It is obvious, therefore, that owing to this ball and socket joint structure of the bearing for the shaft 3 the latter will automatically aline itself in the bearing, and the production of excessive bending strains on the bearing and shaft is thereby avoided. In order to secure the spherical bearing part 20 against circumferential or axial movement, a projection 22 extending radially from the same passes through an aperture 23 in the top wall of the bearing bracket 2. This projecting lug 22 advisably is provided with a bore which is continued through the nut so as to facilitate the lubrication of the threaded portion of the sleeve 16 in engagement with the nut 19.

A thrust bearing 26 preferably in the form of a ball bearing is interposed between the inner end of the tubular sleeve 16 and the other end of the hub of the drum 10. It will be obvious from the above that upon turning the tubular sleeve 16 within the nut 19 an axial displacement of said sleeve will take place and the inner end of the sleeve will act with more or less force on the thrust bearing 26 to displace thereby axially the drum on the shaft 3 and to bring the elements 7 and 9 of the clutch at the other end of the drum into operative engagement, or permitting the spring 12 surrounding the hub of the fixed clutch member 7 to shift the drum 10 axially to bring the two clutch elements to release position.

For the purpose of turning the tubular sleeve 18 and thereby also adjusting the operative engagement of the clutch elements 7 and 9 from a position of engagement with each other to a complete release, a lever 27 is releasably but fixedly connected with the unthreaded portion of the sleeve 16. The attachment of this operating lever 27 with the smooth portion of the tubular sleeve 16 is effected, as shown in Figs. 2 and 3, by providing said lever 27 at its inner end with an enlarged portion 28 having a semi-cylindrical bore and placing on the opposite side of the threaded sleeve a companion member 29 also having a semi-cylindrical bore, and uniting the two parts by means of bolts 30, in the manner in which connecting rods or the like are adjustably secured to their cranks. It is also obvious that owing to this manner of attaching the operating lever 27 to the smooth portion of the threaded sleeve 16 the angular relation of said lever with respect to the screw thread 18 may be altered as required. The outer or free end of the lever 27 preferably carries a transverse pin 31 with which a bar or other operating element (not shown), under control of an attendant, may be secured, whereby upon moving said lever 27 in one or the other direction circumferentially of the threaded sleeve 16, a rotation of said threaded sleeve will be induced, which will also cause longitudinal displacement of said sleeve owing to its guidance in the nut 19.

The lever 27 being clamped by the bolts 30 to the threaded sleeve 16 will also be thereby displaced axially with respect to the shaft, and this axial displacement is utilized for effecting also an axial displacement of the drum 10. When it is desired to interrupt the engagement of the two clutch surfaces and, in case the pressure with which the clutch surfaces where forced into engagement with each other was so large that the action of the spring 16 would not be sufficient to cause an axial displacement of the drum, the drum is displaced also by the lever 27. The inner end of this lever and the companion member 29 of the same are provided with inwardly projecting complementary circumferential flange portions 32 entering a circumferential groove 33 on the hub of the drum.

In the operation of the devices the hoisting drum will remain at rest, even though the shaft 3 is rotated through gear 4, until through operation of the lever 27 an axial displacement of the drum 10 is effected, shifting thereby the two clutch elements 7, 9 into engagement with each other against the action of the spring 12. When it is then desired to interrupt the drive of the drum 10 without, however, interrupting the drive of the shaft 3, the lever 27 is operated to cause the tubular sleeve 16 to enter again to the full extent into the interior of the nut 19 permitting thereby the spring 12 to force the drum 10 away from the clutch member 7, the force of the spring being supported by the positive engagement of the projecting flange 32 with the circumferential groove 33 of the hub.

I claim:—

1. In a hoisting mechanism, a drum, a shaft on which the drum is loosely mounted, means for rotating the shaft, a clutch member fixed to the shaft, a threaded sleeve loosely surrounding the shaft, a screw threaded bearing in engagement with the threads of the sleeve and held against rotation, a self-alining bearing surrounding said screw threaded bearing and supporting the shaft and said screw threaded bearing, and means detachably fixed to the sleeve for imparting a turning movement and an axial displacement to the same, said means being adapted to effect axial displacement of the drum in either direction in dependence upon the direction of turning movement of said sleeve.

2. In a hoisting mechanism, a drum, a shaft on which the drum is loosely mounted, means for rotating the shaft, a clutch member fixed to the shaft, a screw threaded sleeve, a nut in which said sleeve is supported, a self-alining bearing for said nut and shaft, means for imparting a turning movement to said sleeve and thereby axially displacing the same, said means being operatively associated with the drum for effecting axial displacement in direction towards and away from said clutch member upon turning of said sleeve, and an independently rotated spacer element inserted between said sleeve and said drum.

3. In a hoisting mechanism, a drum, a shaft on which the drum is loosely mounted, a clutch member fixedly supported by the shaft, means for rotating the shaft, a sleeve having a screw threaded portion at one end and a smooth portion at the other end, a bearing nut engaged by the threaded portion of the sleeve, a self-alining bearing in which said nut and shaft are supported, a lever fixedly secured to the smooth portion of the sleeve and engaging the drum and adapted to turn the sleeve in either direction and to effect thereby axial displacement of said drum relatively to said clutch member.

4. In a hoisting mechanism, a drum, a shaft on which the drum is loosely mounted, a clutch member fixed to the shaft, means for rotating the shaft, a screw threaded sleeve having a smooth cylindrical portion loosely surrounding said shaft, a fixed nut engaged by the threaded portion of the sleeve, a bearing of partially spherical contour in which the nut is supported, said bearing also carrying the shaft, and a lever fixed to the smooth portion of the sleeve and having a projection entering a circumferential groove on the drum.

In witness whereof I affix my signature.

NILS MATHIAS ROSENDAHL.